US011481720B2

(12) United States Patent
Abeywardena et al.

(10) Patent No.: US 11,481,720 B2
(45) Date of Patent: Oct. 25, 2022

(54) UAV BALCONY DELIVERIES TO MULTI-LEVEL BUILDINGS

(71) Applicant: WING Aviation LLC, Mountain View, CA (US)

(72) Inventors: Dinuka Abeywardena, Mountain View, CA (US); Jesse Blake, Palo Alto, CA (US); James R. Burgess, Redwood City, CA (US); Marco Caflisch, San Francisco, CA (US); Brandon Jones, Redwood City, CA (US); Damien Jourdan, San Jose, CA (US); Kyle Krafka, Los Altos, CA (US); James Schmalzried, San Jose, CA (US)

(73) Assignee: Wing Aviation LLC, Mountain View, CA (US)

( * ) Notice: Subject to any disclaimer, the term of this patent is extended or adjusted under 35 U.S.C. 154(b) by 448 days.

(21) Appl. No.: 16/703,170

(22) Filed: Dec. 4, 2019

(65) Prior Publication Data

US 2021/0174301 A1 Jun. 10, 2021

(51) Int. Cl.
*G06Q 10/00* (2012.01)
*G06Q 10/08* (2012.01)
(Continued)

(52) U.S. Cl.
CPC ..... *G06Q 10/08355* (2013.01); *B64C 39/024* (2013.01); *G05D 1/0016* (2013.01);
(Continued)

(58) Field of Classification Search
CPC .......... G06Q 10/08355; G06Q 10/0832; B64C 39/024; B64C 2201/127; B64C 2201/128;
(Continued)

(56) References Cited

U.S. PATENT DOCUMENTS 9,817,396 B1 11/2017 Takayama et al.
9,984,579 B1 * 5/2018 Harris .................. G08G 5/0069
(Continued)

FOREIGN PATENT DOCUMENTS

CN 106081426 B 11/2016
CN 205971863 U 2/2017
(Continued)

OTHER PUBLICATIONS

International Search Report and Written Opinion, dated Nov. 30, 2020, in corresponding International Patent Application No. PCT/US2020/050498, 13 pages.

*Primary Examiner* — Russell Frejd
*Assistant Examiner* — Brittany Renee Peko
(74) *Attorney, Agent, or Firm* — Christensen O'Connor Johnson Kindness PLLC

(57) ABSTRACT

A technique for validating a balcony to receive delivery of a parcel via a UAV includes obtaining a first identification of a general location of the balcony; generating a first image representing a building including the balcony where the first image is selected based upon the location identified; obtaining a second identification or a confirmation of a precise location of the balcony in the building where the second identification or the confirmation are received in response to an end-user interaction with the first image; determining a deliverability score based at least in part on the precise (Continued)

location of the balcony; and indicating an enrollment status to the end-user where the enrollment status is generated based upon the deliverability score.

25 Claims, 8 Drawing Sheets

(51) Int. Cl.
  *B64C 39/02* (2006.01)
  *G05D 1/00* (2006.01)
  *G05D 1/06* (2006.01)
  *G06V 10/22* (2022.01)
  *G06V 20/10* (2022.01)

(52) U.S. Cl.
  CPC ......... *G05D 1/0022* (2013.01); *G05D 1/0676* (2013.01); *G06Q 10/0832* (2013.01); *G06V 10/22* (2022.01); *G06V 20/176* (2022.01); *B64C 2201/127* (2013.01); *B64C 2201/128* (2013.01)

(58) Field of Classification Search
  CPC ... G05D 1/0016; G05D 1/0022; G05D 1/0676
  See application file for complete search history.

(56) References Cited

U.S. PATENT DOCUMENTS

| | | |
|---|---|---|
| 10,121,117 B1 | 11/2018 | Boyd et al. |
| 10,163,177 B2 | 12/2018 | Farris et al. |
| 10,834,523 B1 * | 11/2020 | Rao .................. H04W 4/021 |
| 2015/0120094 A1 * | 4/2015 | Kimchi .................. B64D 1/12 |
| 2016/0189101 A1 * | 6/2016 | Kantor ............ G06Q 10/08355 |
| 2017/0011333 A1 | 1/2017 | Greiner et al. |
| 2017/0267347 A1 * | 9/2017 | Rinaldi .................. B64D 1/22 |
| 2017/0286892 A1 * | 10/2017 | Studnicka ............ G06Q 10/083 |
| 2018/0005180 A1 | 1/2018 | Jalaldeen et al. |
| 2018/0105289 A1 | 4/2018 | Walsh et al. |
| 2019/0012640 A1 | 1/2019 | Ferguson et al. |
| 2019/0041852 A1 | 2/2019 | Schubert et al. |
| 2019/0147751 A1 | 5/2019 | Sasao |
| 2020/0207474 A1 * | 6/2020 | Foggia .................. B64D 1/22 |

FOREIGN PATENT DOCUMENTS

| | | |
|---|---|---|
| CN | 107748570 A | 3/2018 |
| WO | 2019055690 A | 3/2019 |

* cited by examiner

US 11,481,720 B2

UAV BALCONY DELIVERIES TO MULTI-LEVEL BUILDINGS

TECHNICAL FIELD

This disclosure relates generally to unmanned aerial vehicles (UAVs), and in particular but not exclusively, relates to the use of UAVs for deliveries of packages.

BACKGROUND INFORMATION

Drone delivery is positioned to change the way lightweight goods are moved between locations (e.g. from retailer to consumer). However high-density urban spaces, particularly multi-level buildings, present a challenge to aircraft that are attempting to make a delivery. The most straightforward and desirable delivery approaches have an unobstructed path for the drone to follow during its route to drop off a package, which is challenging to identify and allocate in high-density urban spaces. The challenge of identifying the correct delivery destination is particularly acute for urban apartment residences that are tightly situated with low incidence of externally distinguishing features. Compounding the problem is the navigational challenge of maneuvering inside the "urban canyon" where traditional navigation methods (e.g. GPS) are unreliable.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Embodiments of a system, apparatus, and method of operation for validation and enrollment of balconies into a parcel delivery service using unmanned aerial vehicles (UAVs) are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

One solution for delivering lightweight parcels to multi-level buildings, such as high-density urban apartment units, is to use unmanned aerial vehicles (UAVs) to deliver parcels to the balconies of these units. This delivery route often provides a clear, unobstructed approach to a location that is conveniently accessed by the customer. Not only are balconies convenient locations for the customer, but they are typically secure locations over which only the customer has ready access. The convenience and security of private balconies makes these locations a particularly attractive delivery drop-off destination from the customer's perspective. As such, balconies are well suited for UAV deliveries of lightweight parcels, such as letters and documents, prescription drugs, small grocery items, prepared or hot meals, small electronics, etc.

Figure 1:
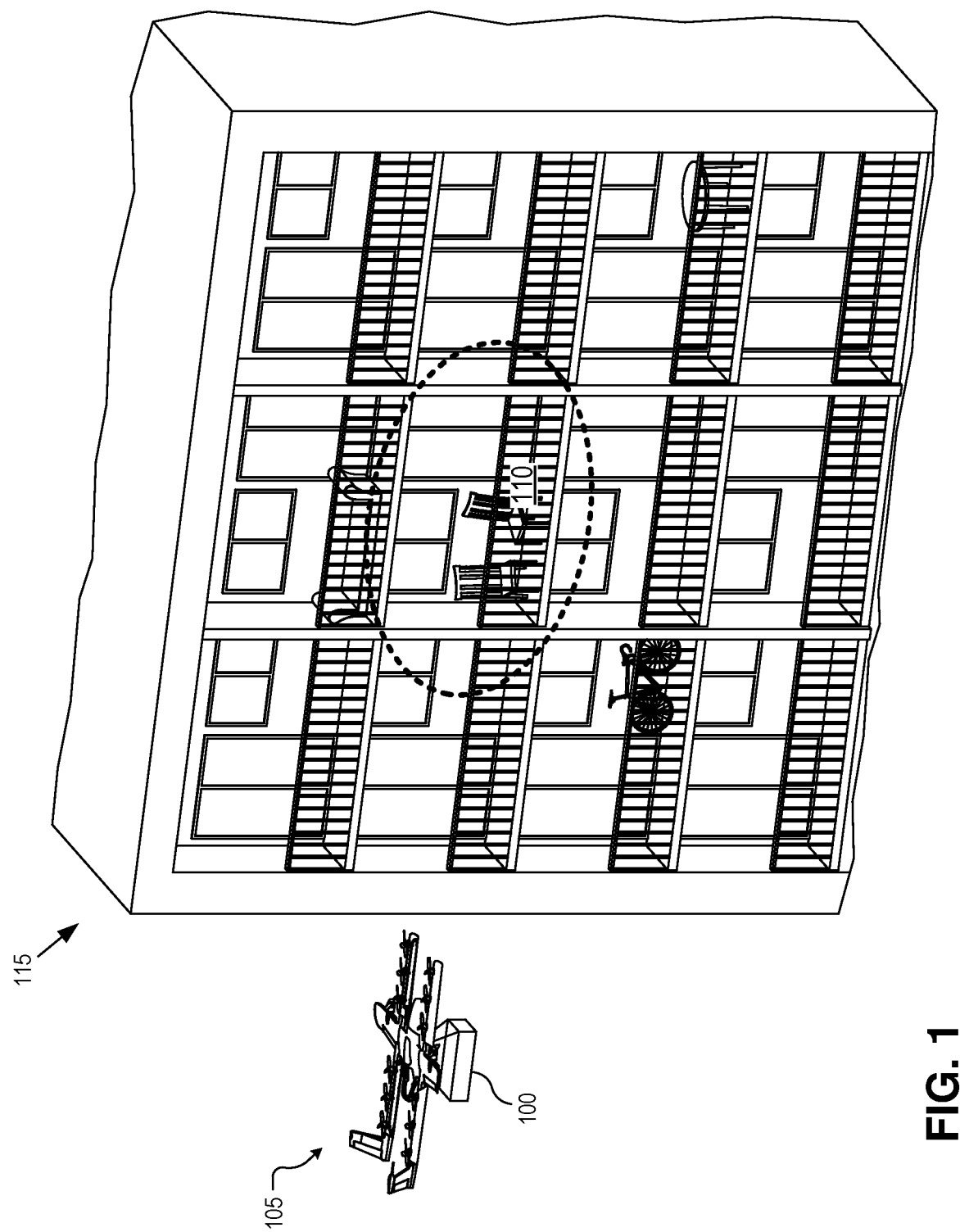
FIG. 1 illustrates delivery of a parcel by a unmanned aerial vehicle (UAV) to a balcony of a multi-level building, in accordance with an embodiment of the disclosure.

FIG. 1 illustrates the delivery of a parcel 100 by a UAV 105 to a balcony 110 of a multi-level building 115, in accordance with an embodiment of the disclosure. However, before UAV 105 can commence deliveries of parcels 100, balcony 110 must be validated and then enrolled in the aerial delivery service. Validation of balcony 110 to receive aerial deliveries includes identifying the correct balcony 110 from the other closely located and similar looking neighboring balconies. This task alone can be challenging in large, high-density, multi-level urban buildings. Identification of the correct balcony for enrollment with a corresponding customer account ensures future parcels 100 are delivered to the correct end-user/customer. In addition to identifying the correct balcony, validation includes ensuring that parcels 100 can be reliably and safely delivered to the requested balcony. Reliable, safe deliveries require an unobstructed path to balcony 110 to permit safe ingress and egress by UAV 105. Sufficient space and clearance on or around balcony 110 is also needed.

Embodiments herein describe a procedure for validating balcony 110 to receive deliveries of parcels 100. The validation techniques ensure correct identification and association of balcony 110 with a given customer along with determination of whether ingress and egress to balcony 110 is unobstructed and whether balcony 110 is adequately sized and/or free of obstructions to receive aerial deliveries. Once validation is successfully achieved, enrollment to receive future parcels 100 via UAV aerial deliveries can proceed.

The illustrated embodiment of UAV 105 is a vertical takeoff and landing (VTOL) UAV that includes separate propulsion units for providing horizontal and vertical propulsion. UAV 105 is a fixed-wing aerial vehicle, which as the name implies, has an airfoil that can generate lift based on the wing shape and the vehicle's forward airspeed when propelled horizontally. The illustrated embodiment of UAV 105 is merely demonstrative, and other types of UAVs, fixed wing or not, may be used to provide aerial deliveries to balconies of multi-level buildings.

It should be understood that references herein to an "unmanned" aerial vehicle or UAV can apply equally to autonomous and semi-autonomous aerial vehicles. In a fully autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator may control high level navigation decisions for a UAV, such as specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight control inputs to achieve the route and avoid obstacles while navigating the route, and so on.

Figure 2:
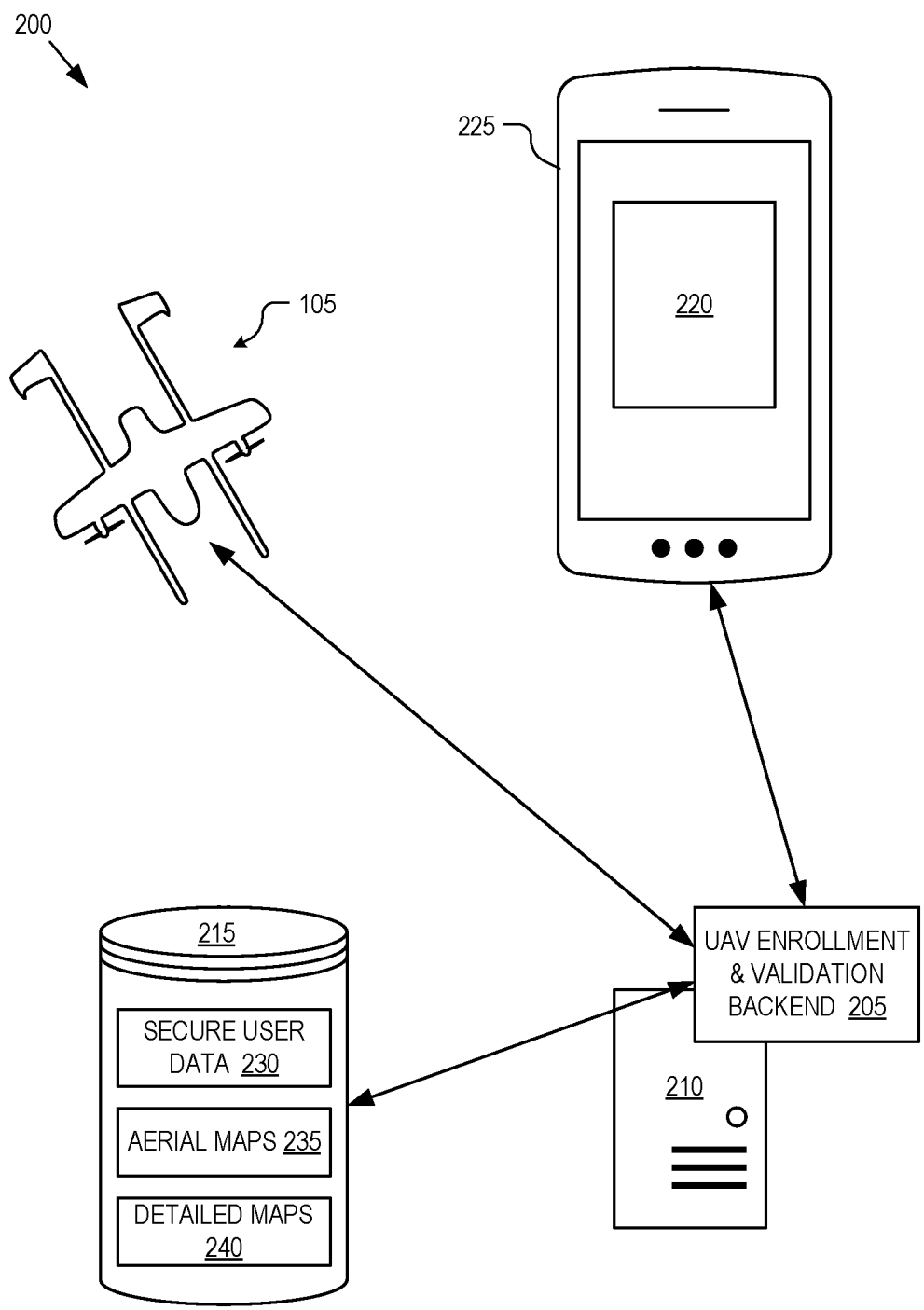
FIG. 2 illustrates a UAV parcel delivery system, in accordance with an embodiment of the disclosure.

FIG. 2 illustrates a UAV parcel delivery system 200, in accordance with an embodiment of the disclosure. The illustrated embodiment of UAV parcel delivery system 200 includes one or more UAVs 105, a UAV enrollment & validation backend 205 running on one or more cloud-based servers 210, one or more databases 215, and a client-side application 220 executable on a computing device 225 (e.g., mobile computing device). The illustrated embodiment of database 215 includes secure user data 230, aerial maps 235, and detailed maps 240.

Backend 205 communicates with application 220 and UAVs 105 to manage user accounts, solicit user data and balcony information from both application 220 and UAVs 105 to validate balconies and enroll new customers for the aerial delivery service. Backend 205 maintains secure user data 230 in database 215 related to the customer accounts and data related to the physical location, size, geometry, delivery routes, identifiable attributes, etc. of the customers' balconies. User data 230 is anonymized where possible, and such anonymization may occur within any component of system 200 starting with the immediate information gateways or sources of user data 230, such as application 220 or UAV 105. Backend 205 also accesses aerial maps 235 from database 215, which detail buildings and the vicinities surrounding buildings associated with customer accounts. Aerial maps 235 not only aid in identification of a customer's building during the enrollment and validation process, but may also be analyzed for ingress and egress obstructions to balconies, such as trees, telephone poles, adjacent buildings, towers, etc. Detailed maps 240 may include various visual models or pictures of buildings for the purposes of navigation to/from and identification of balconies. Where possible, access to user data 230 is limited to the automated machines and algorithms needed to enroll and validate a balcony, and anonymized or obscured from potential human operators. Application 220 provides a client-side interface to enable customers to communicate with backend 205, enroll in the aerial delivery system, and potentially place orders for delivery of one or more parcels 100 after successful enrollment.

Although system 200 illustrates backend 205 as residing on a single server 210 and secure user data 230, aerial maps 235, and detailed maps 240 stored in a single database 215, it should be appreciated that system 200 may be implemented as a distributed system with components stored and executing in many locations spread across many remote computing platforms.

Figure 3:
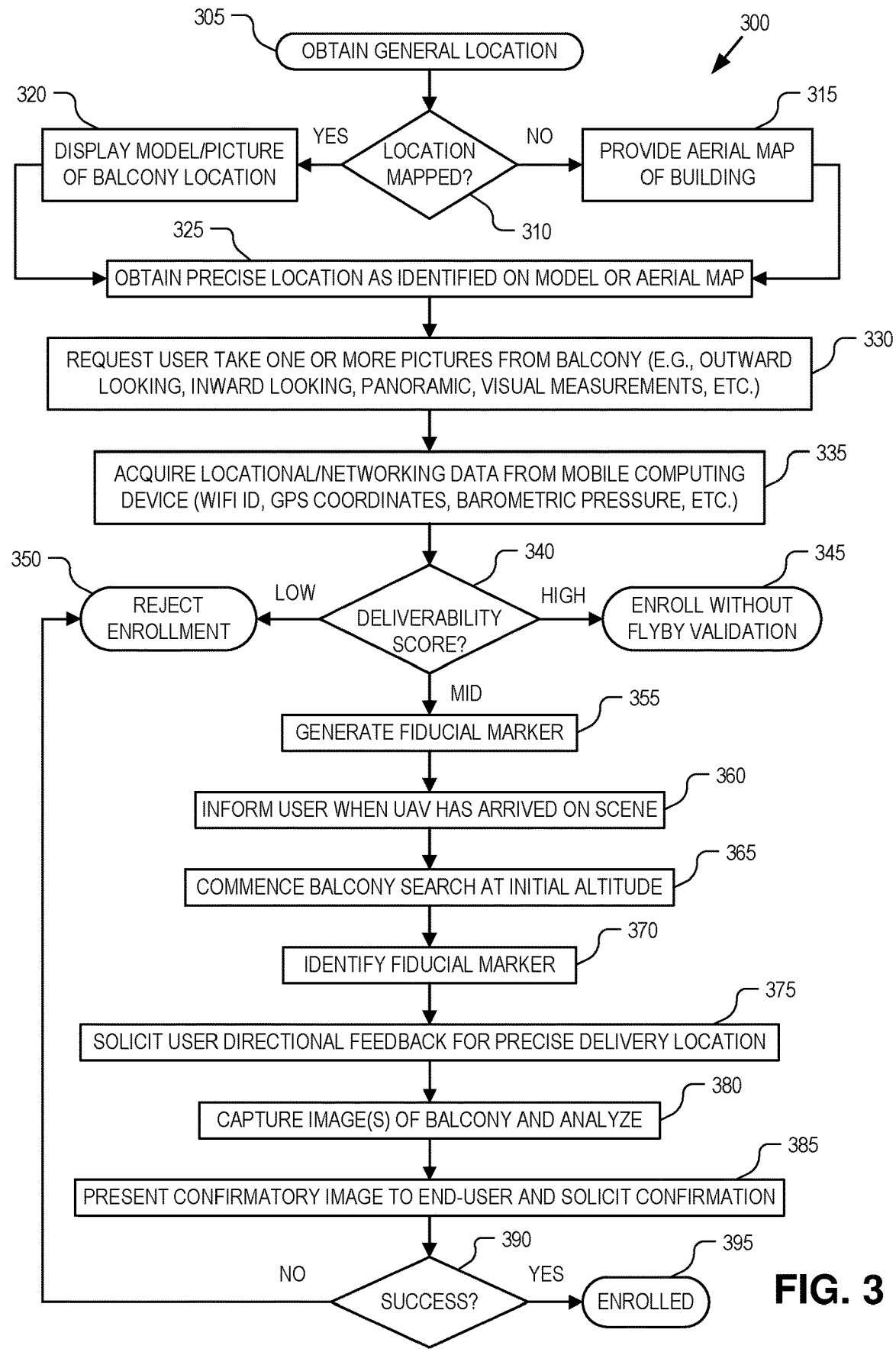
FIG. 3 is a flow chart illustrating operation of the UAV parcel delivery system to enroll and validate a balcony for parcel deliveries via UAVs, in accordance with an embodiment of the disclosure.

FIG. 3 is a flow chart illustrating a process 300 for operation of the UAV parcel delivery system 200 to enroll and validate balcony 110 for aerial parcel deliveries, in accordance with an embodiment of the disclosure. The order in which some or all of the process blocks appear in process 300 should not be deemed limiting. Rather, one of ordinary skill in the art having the benefit of the present disclosure will understand that some of the process blocks may be executed in a variety of orders not illustrated, or even in parallel. Furthermore, several of the processing blocks depict steps that are optional and may be omitted.

In a process block 305, backend 205 obtains an identification of a general location of a new customer's balcony via application 220 executing on computing device 225. In one embodiment, computing device 225 is the customer's mobile computing device, such as a smartphone, tablet, laptop, or otherwise. In one embodiment, the identification of the general location is a physical address of the customer's building. If the building is a multi-dwelling unit, then the physical address may also include a unit number (e.g., suite or apartment number). Additionally (or alternatively), the customer may be solicited to enter one or more of: the floor level of their unit, an approximate height from ground of their balcony, the number of balconies above or below their balcony, or other general location information.

Figure 4:
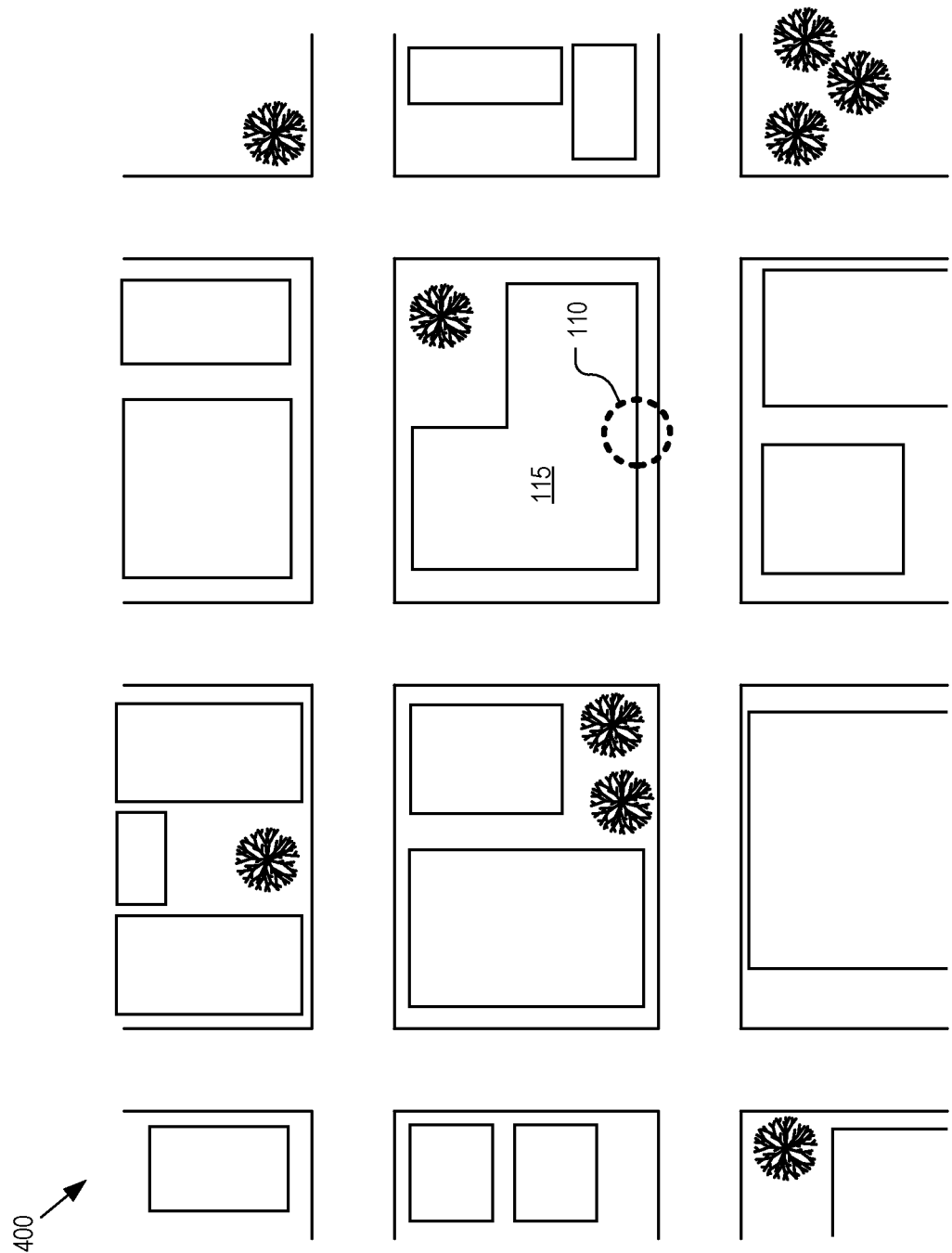
FIG. 4 illustrates an aerial map illustrating a general location of a balcony, which may be used to obtain identification or confirmation of a more precise location of the balcony, in accordance with an embodiment of the disclosure.

The general location information (e.g., physical address with unit number) is used by backend 205 to select an image from database 215 (e.g., selected from aerial maps 235 or detailed maps 240) to aid the user in precisely identifying the location of their balcony 110 on their building 115. If the customer's building has not been mapped, or mapped sufficiently well to know the precise location of their balcony based upon their unit number (decision block 310), then process 300 continues to a process block 315. In process block 315, backend 205 sends an aerial map 235 to application 220 for display to the customer. Aerial map 235 may be selected based upon the user's physical address. FIG. 4 illustrates an example aerial map image 400 that includes the customer's building 115 and surrounding vicinity. The customer is then solicited to precisely identify the location of their balcony 110 on aerial map image 400 by end-user interaction with aerial map 400 (process block 325). For example, the end-user of application 220 may physically touch (or otherwise indicate) a position on aerial map image 400 to convey the precise location of their balcony 110 on their building 115.

Figure 5:
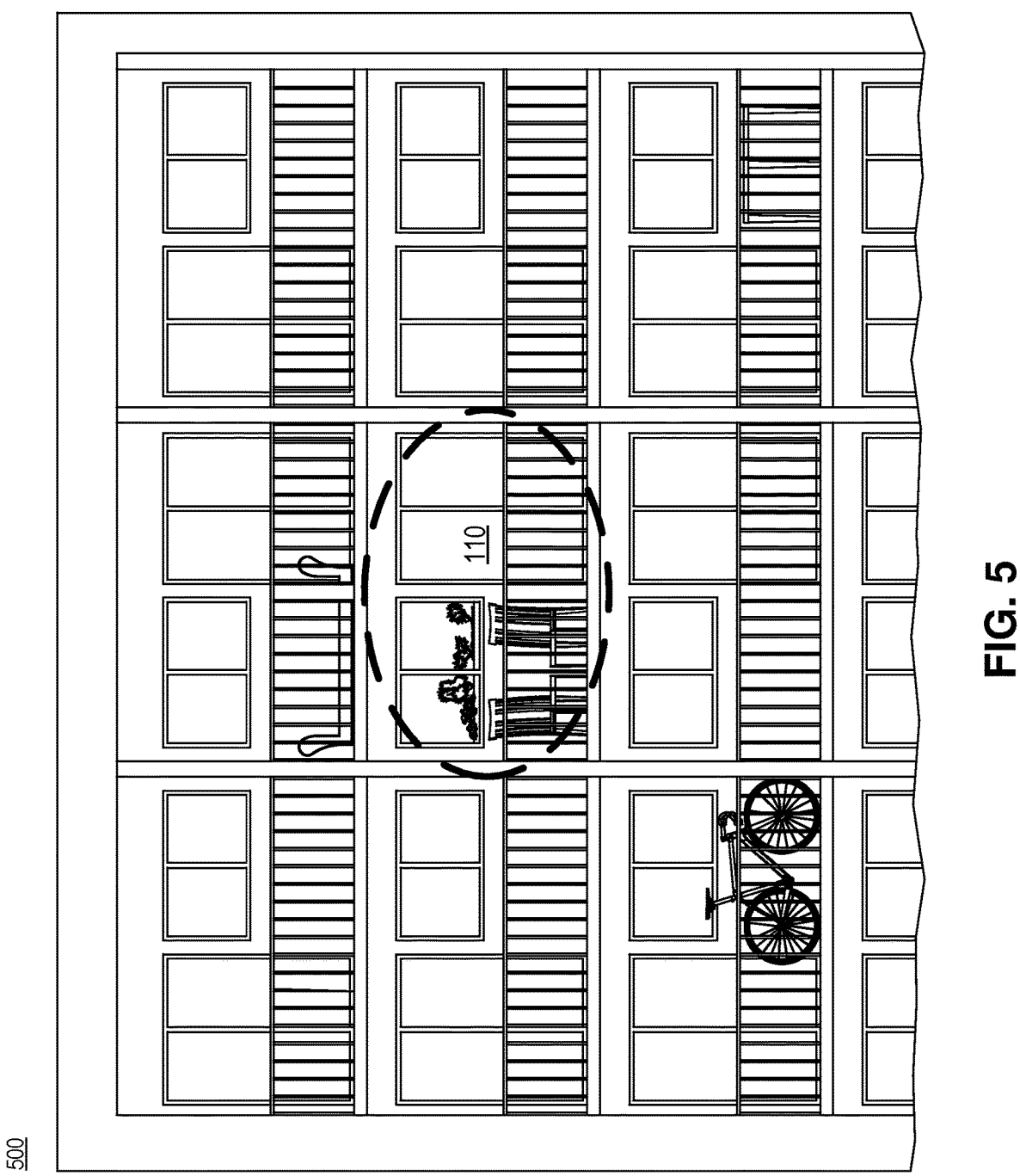
FIG. 5 illustrates a visual model or picture of a side of a building including a balcony to be enrolled and validated, in accordance with an embodiment of the disclosure.

In some instances, the customer's building may be sufficiently mapped (decision block 310) for backend 205 to display a visual model or a picture of a side of building 115 that the system believes corresponds to the customer's unit number (process block 320). For example, enough existing customers within building 115 may have already enrolled in the aerial delivery service such that backend 205 has constructed a model or a picture of building 115 and is able to make an educated determination or localization of the precise location of balcony 110 on building 115. FIG. 5 illustrates an example visual model or picture 500 of the side of building 115 that may be presented to the prospective new customer. The end-user may then be asked to identify their balcony 110 via physical interaction with the image (e.g., touching the precise location). Alternatively, the system may highlight a position believed to correspond to the prospective new customer's balcony 110, and solicit a confirmation of the precise balcony location (process block 325).

The precise location determined in process block 325 may be translated by backend 205 into global positioning system (GPS) coordinates of the customer's balcony. However, in most scenarios, balconies 110 are still too densely populated in multi-level buildings for unique identification or remote determination of deliverability to balcony 110. Accordingly, in a process block 330, the end-user is solicited to use application 220 and computing device 225 to capture one or more pictures of balcony 110 or one or more pictures from balcony 110.

For example, application 220 may request the end-user to capture one or more pictures while standing on balcony 110. These pictures may be pictures outward from balcony 110 to capture images of any potential ingress or egress obstructions for UAV 105. The outward balcony pictures may also be used by UAV 105 to aid visual navigation to balcony 110 and identify balcony 110 from the other balconies in building 115. These pictures may be pictures of the specific location on balcony 110 where the customer wants their packages dropped off. Application 220 may guide the end-user to acquire pictures from several different vantage points and/or directions. In one embodiment, application 220 may request that the end-user stand in one or more locations on balcony 110 and acquire one or more panoramic pictures or pictures in specified directions. The pictures may be of a quality and nature to not only identify any ingress/egress obstructions for an aerial vehicle, but also extract visual measurements so that backend 205 can estimate a size of balcony 110 (e.g., width and depth) and/or a size of the access opening to balcony 110 (e.g., area above railing and below the next story balcony). Thus, backend 205 may analyze the pictures to determine if there is sufficient space on balcony 110 for parcel deliveries.

In some embodiments, application 220 may request the end-user to obtain one or more pictures of their balcony from the ground. The ground based pictures may also be used to identify any obstructions or hazards for UAV 105, and/or further aid visual navigation by UAV 105 to the correct balcony.

In a process block 335, application 220 may further request authorization from the end-user to gather additional location identification information from computing device 225. Computing device 225 may be queried for GPS coordinates, barometric pressure, or other available data that can aid locating balcony 110. In one embodiment, computing device 225 may be queried, with the user's permission, for networking identifiers that identify wireless network signals used by computing device 225 to wirelessly communicate with other computing devices. For example, application 220 may obtain the name or identifier of the wireless access point (e.g., service set identifier) or Bluetooth signal used by computing device 225. This information may be used by UAV 105 to hasten the search and identification of the correct balcony 110 once it arrives on scene for a flyby validation. This identifying information is for use by the automated systems, and thus anonymized where possible, or otherwise obscured from human operators when human operators perform supporting roles.

Once backend 205 has acquired the balcony's general location (e.g., building address, unit number, floor number), precise location (as identified on the aerial map image, visual model, or picture), along with any additional information (e.g., pictures, locational data, networking identifiers), the collected data is analyzed to calculate a deliverability score (decision block 340). The deliverability score may be a measure or estimation of aerial obstructions to ingress/egress and whether balcony 110 has sufficient size or clearances to accept parcel deliveries via air. The deliverability score may also take into consideration previous validations/enrollments (or rejections thereof) for neighboring balconies in the same building. In some scenarios, the data may be sufficiently clear (e.g., above a threshold high score) to enroll the customer and their balcony without the need for a flyby validation by UAV 105 (process block 345). In other scenarios, the data may be sufficiently clear (e.g., below a threshold low score) so as to summarily reject the enrollment without need for a flyby validation (process block 350). However, in many cases, the deliverability score may fall in a middle range that calls for dispatching UAV 105 to perform an initial or one-time flyby validation. In this mid-range scenario where a flyby validation is ordered, process 300 continues to a process block 355.

In process block 355, the end-user may be provided with a fiducial marker that is associated with balcony 110 by backend 205. The fiducial marker operates as a visual code that UAV 105 can seek out once it arrives on scene and use to identifying the correct balcony. The fiducial marker may be provided to the end-user via application 220 in the form of a visual code, such as a quick response (QR) code. In one embodiment, the end-user may print the fiducial marker and attach it to their balcony. In yet other embodiments, the fiducial marker may simply be displayed by application 220 on computing device 225 for the end-user to display to UAV 105 from balcony 110 (e.g., see fiducial marker 805 in FIG. 8).

Once UAV 105 arrives in the vicinity of building 115, backend 205 may notify the end-user that UAV 105 is on scene. The notification may be in the form of a text message, phone call, or in-app notification. The message may be viewed as an alert that UAV 105 is currently seeking out balcony 110. If the end-user opted not to print out the fiducial marker and adhere it to balcony 110, then the end-user may simply hold computing device 225 outward in a prominent manner for UAV 105 to discover (e.g., see FIG. 8).

When UAV 105 arrives on scene for the flyby validation, UAV 105 may initially go to building 115 identified by the physical address provided in process block 305, and further the side of building 115 identified by the end-user in process block 325. Additionally, UAV 105 may hover at an initial altitude or height determined from the end-user's unit number or floor level (process block 365). Alternatively (or additionally), UAV 105 may hover at an initial altitude matching the barometric pressure obtained from computer device 225, if provided. From this initial altitude, UAV 105 may use visual based navigation techniques to search for balcony 110. These visual based techniques may reference the images provided by the end-user in process block 330 while also optically scanning for the fiducial marker. Additionally, UAV 105 may electronically scan for the user's network identifier (e.g., WiFi network name or service set identifier (SSID), Bluetooth signal, etc.) as further clues of whether UAV 105 is in the vicinity of the customer's balcony 110. The search may continue until UAV 105 is able to identify fiducial marker 805 (process block 370), or for a finite period of time. While searching for balcony 110, UAV 105 would take precautions to preserve privacy by anonymizing private or sensitive visual or optical information, for example by blurring windows, faces, or other such information.

Figure 6:
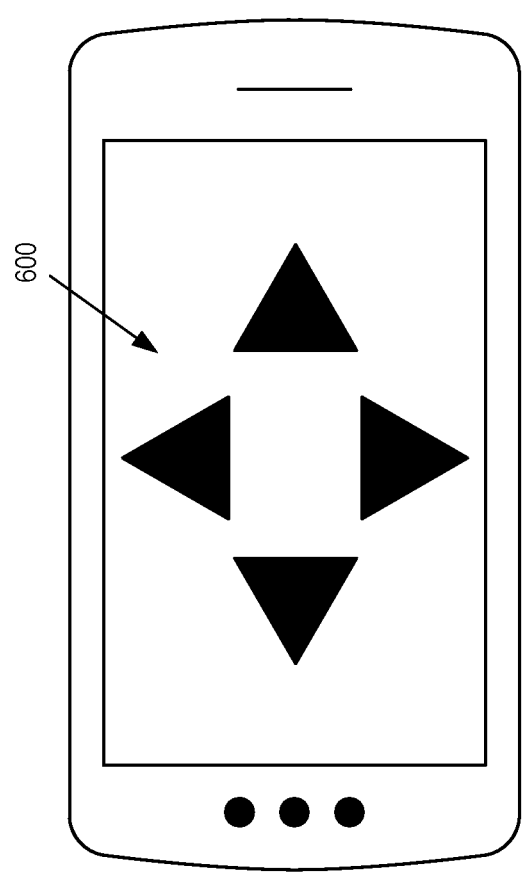
FIG. 6 illustrates an example user interface for receiving directional feedback from the end-user for identification of a target delivery location on the balcony, in accordance with an embodiment of the disclosure.
Figure 7:
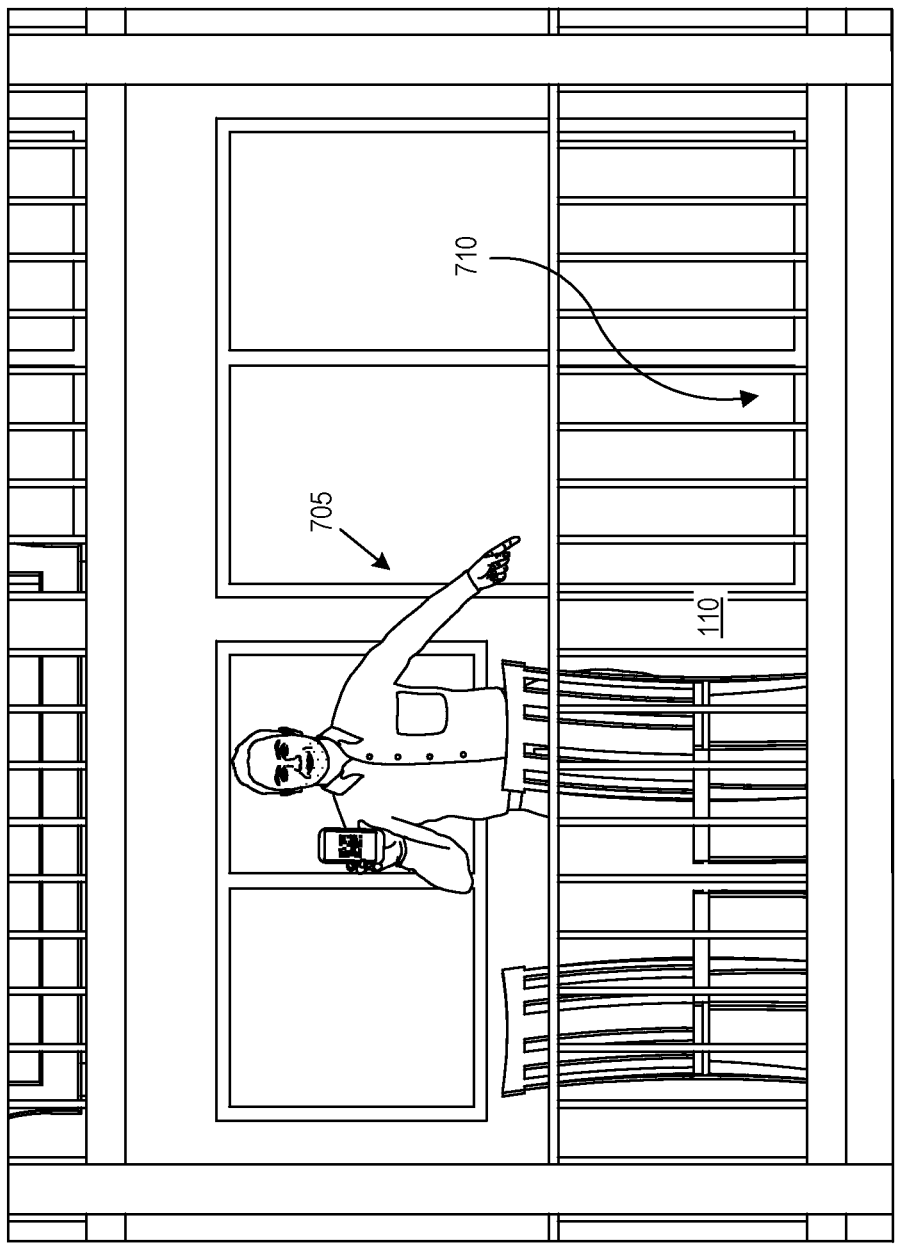
FIG. 7 illustrates providing directional feedback to a UAV via gestures for identification of a target delivery location on the balcony, in accordance with an embodiment of the disclosure.

In one embodiment, application 220 may solicit the end-user to provide directional feedback to aid UAV 105 in the identification of balcony 110 and/or refinement of a precise target delivery location on balcony 110 (process block 375). For example, in one embodiment, application 220 may display a user interface, such as user interface 600 illustrated in FIG. 6, that permits the end-user to provide directional feedback to aid UAV 105 to get on target. The directional feedback may not provide the end-user with actual or direct navigation control over UAV 105, but rather is considered information feedback to UAV 105, which it may take under advisement. In one embodiment, UAV 105 may permit the end-user to provide directional feedback in the form of gestures, such as the gesture 705 illustrated in FIG. 7 to identify target delivery location 710 on balcony 110. Once the target delivery location 710 is identified, both balcony 110 and target delivery location 710 may be recorded/registered by backend 220.

Figure 8:
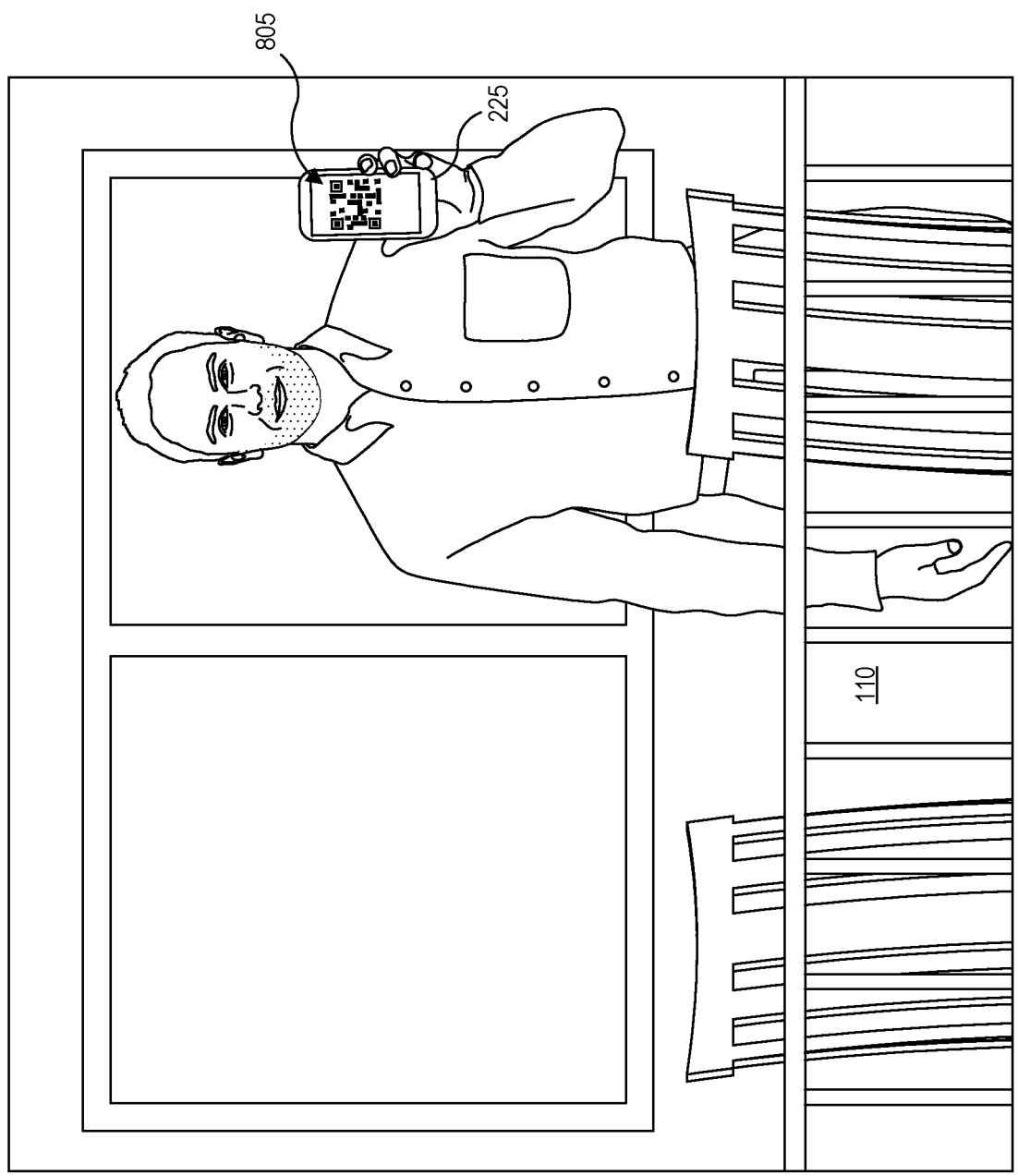
FIG. 8 illustrates displaying a fiducial marker to aid a UAV with identification of a balcony and also how a confirmatory image acquired by the UAV may be used to validate correct identification of the balcony, in accordance with an embodiment of the disclosure.

In a process block 380, UAV 105 captures one or more images of balcony 110, which may include fiducial marker 805 (see FIG. 8). The images are analyzed by backend 205 not only for identification, but also to determine whether balcony 110 is viable for receiving aerial parcel deliveries. Deliverability is based upon clear ingress and egress along with sufficient clearances and space. One of the images may also serve as a confirmatory image sent back to the end user via backend 205 and application 220. In a process block 385, the confirmatory image captured by UAV 105 is provided to the end user and a final confirmation solicited. If the end user confirms the confirmatory image and backend analysis of the images deems balcony 110 to be deliverable (decision block 390), then balcony 110 is validated and enrolled (process block 395). If the end user fails to confirm the confirmatory image or backend 205 analysis determines that balcony 110 is not accessible or safe for deliveries (decision block 390), then validation fails and enrollment is rejected (process block 350).

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A computer-implemented method for validating a balcony to receive an aerial delivery of a parcel via an unmanned aerial vehicle (UAV), the method comprising:
    obtaining, via a computing device of an end-user, a first identification of a general location of the balcony;
    providing, for display on the computing device, a first image representing a building, wherein the building includes the balcony and the first image is selected based upon the general location identified by the end-user;
    obtaining, via the computing device, a second identification or a confirmation of a precise location of the balcony in the building, wherein the second identification or the confirmation are received in response to an end-user interaction with the first image;
    receiving a picture captured with the computing device of the end-user, wherein the picture is of the balcony or captured from the balcony;
    determining a deliverability score based at least in part on the precise location of the balcony and the picture captured with the computing device; and
    indicating an enrollment status to the end-user, via the computing device, the enrollment status generated based upon the deliverability score.

2. The computer-implemented method of claim 1, wherein the enrollment status includes at least one of an enrollment rejected indication, an enrollment successful indication, or a flyby validation required indication.

3. The computer-implemented method of claim 1, wherein determining the deliverability score comprises:
    analyzing the picture for one or more of an obstruction to accessing the balcony or sufficient space on the balcony to deliver the parcel via the UAV.

4. The computer-implemented method of claim 1, wherein the first identification of the general location of the balcony comprises a physical address of the building, and a unit number associated with the balcony, if any.

5. The computer-implemented method of claim 4, further comprising:
    determining an initial altitude associated with the balcony based upon one or more of the first identification of the general location, the second identification of the precise location, or the confirmation of the precise location; and
    instructing the UAV to hover at the initial altitude upon arriving in a vicinity of the balcony to commence searching for the balcony.

6. The computer-implemented method of claim 1, wherein generating the first image representing the building comprises at least one of:
  generating an aerial map image of a vicinity surrounding and including the building; or
  providing a visual model or a picture of a side of the building that includes the balcony.

7. The computer-implemented method of claim 6, wherein obtaining the second identification comprises soliciting the end-user to indicate the precise location by touching a position on the aerial map image, the visual model, or the picture where the balcony is located.

8. The computer-implemented method of claim 1, further comprising:
  acquiring a network identifier from the computing device, wherein the network identifier identifies a wireless network signal used by the computing device to wirelessly communicate with other computing devices; and
  providing the network identifier to the UAV to aid in locating the balcony.

9. The computer-implemented method of claim 1, further comprising:
  generating a fiducial marker;
  associating the fiducial marker with the balcony or the end-user; and
  providing the fiducial marker to the computing device for display from the balcony to aid the UAV in identification of the balcony.

10. The computer-implemented method of claim 9, further comprising:
  informing the end-user, via the computing device, that the UAV has arrived in a vicinity of the balcony; and
  requesting that the fiducial marker be displayed from the balcony for visual identification by the UAV.

11. The computer-implemented method of claim 1, further comprising:
  informing the end-user, via the computing device, that the UAV has arrived in a vicinity of the balcony;
  soliciting the end-user to provide directional feedback to the UAV for identification of a target delivery location on the balcony; and
  registering the target delivery location for future deliveries to the balcony based at least in part upon the directional feedback.

12. The computer-implemented method of claim 1, further comprising:
  providing a confirmatory image of the balcony to the end-user, the confirmatory image acquired by the UAV during a validation flyby; and
  soliciting the end-user to validate the confirmatory image as correctly identifying the balcony.

13. At least one machine-accessible storage medium that provides instructions that, when executed by a machine, will cause the machine to perform operations comprising:
  obtaining, via a computing device, a first identification of a general location of a balcony to receive delivery of a parcel via an unmanned aerial vehicle (UAV);
  providing, for display on the computing device, a first image representing a building, wherein the building includes the balcony and the first image is selected based upon the general location identified by the end-user;
  obtaining, via the computing device, a second identification or a confirmation of a precise location of the balcony in the building, wherein the second identification or the confirmation are received in response to an end-user interaction with the first image;
  receiving a picture captured with the computing device of the end-user, wherein the picture is of the balcony or captured from the balcony;
  determining a deliverability score based at least in part on the precise location of the balcony and the picture captured with the computing device; and
  indicating an enrollment status to the end-user, via the computing device, the enrollment status generated based upon the deliverability score.

14. The at least one machine-accessible storage medium of claim 13, wherein the enrollment status includes at least one of an enrollment rejected indication, an enrollment successful indication, or a flyby validation required indication.

15. The at least one machine-accessible storage medium of claim 13, wherein determining the deliverability score comprises:
  analyzing the picture for one or more of an obstruction to accessing the balcony or sufficient space on the balcony to deliver the parcel via the UAV.

16. The at least one machine-accessible storage medium of claim 13, wherein the first identification of the general location of the balcony comprises a physical address of the building, and a unit number associated with the balcony, if any.

17. The at least one machine-accessible storage medium of claim 16, wherein the operations further comprise:
  determining an initial altitude associated with the balcony based upon one or more of the first identification of the general location, the second identification of the precise location, or the confirmation of the precise location; and
  instructing the UAV to hover at the initial altitude upon arriving in a vicinity of the balcony to commence searching for the balcony.

18. The at least one machine-accessible storage medium of claim 13, wherein generating the first image representing the building comprises at least one of:
  generating an aerial map image of a vicinity surrounding and including the building; or
  providing a visual model or a picture of a side of the building that includes the balcony.

19. The at least one machine-accessible storage medium of claim 18, wherein obtaining the second identification comprises soliciting the end-user to indicate the precise location by touching a position on the aerial map image, the visual model, or the picture where the balcony is located.

20. The at least one machine-accessible storage medium of claim 13, wherein the operations further comprise:
  acquiring a network identifier from the computing device, wherein the network identifier identifies a wireless network signal used by the computing device to wirelessly communicate with other computing devices; and
  providing the network identifier to the UAV to aid in locating the balcony.

21. The at least one machine-accessible storage medium of claim 13, wherein the operations further comprise:
  generating a fiducial marker;
  associating the fiducial marker with the balcony or the end-user; and
  providing the fiducial marker to the computing device for display from the balcony to aid the UAV in identification of the balcony.

22. The at least one machine-accessible storage medium of claim 21, wherein the operations further comprise:
  informing the end-user, via the computing device, that the UAV has arrived in a vicinity of the balcony; and requesting that the fiducial marker be displayed from the balcony for visual identification by the UAV.

23. The at least one machine-accessible storage medium of claim 13, wherein the operations further comprise:
informing the end-user, via the computing device, that the UAV has arrived in a vicinity of the balcony;
soliciting the end-user to provide directional feedback to the UAV for identification of a target delivery location on the balcony; and
registering the target delivery location for future deliveries to the balcony based at least in part upon the directional feedback.

24. The at least one machine-accessible storage medium of claim 13, wherein the operations further comprise:
providing a confirmatory image of the balcony to the end-user, the confirmatory image acquired by the UAV during a validation flyby; and
soliciting the end-user to validate the confirmatory image as correctly identifying the balcony.

25. The computer-implemented method of claim 1, further comprising:
determining that an initial flyby validation is necessary, before enrolling the balcony to receive the aerial delivery, based at least in part upon the picture acquired with the computing device of the end-user.

* * * * *